(12) United States Patent
Vikberg et al.

(10) Patent No.: US 10,375,604 B2
(45) Date of Patent: Aug. 6, 2019

(54) METHODS AND APPARATUS FOR INTEGRATION OF WIRELESS WIDE AREA NETWORKS WITH WIRELESS LOCAL AREA NETWORKS

(71) Applicant: Telefonaktiebolaget LM Ericsson (publ), Stockholm (SE)

(72) Inventors: Jari Vikberg, Järna (SE); Niklas Johansson, Sollentuna (SE); Christofer Lindheimer, Linköping (SE); Magnus Stattin, Upplands Väsby (SE); Oumer Teyeb, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 26 days.

(21) Appl. No.: 15/524,292

(22) PCT Filed: Nov. 4, 2014

(86) PCT No.: PCT/SE2014/051304
§ 371 (c)(1),
(2) Date: May 4, 2017

(87) PCT Pub. No.: WO2016/072890
PCT Pub. Date: May 12, 2016

(65) Prior Publication Data
US 2017/0318501 A1 Nov. 2, 2017

(51) Int. Cl.
*H04W 28/08* (2009.01)
*H04W 76/15* (2018.01)
(Continued)

(52) U.S. Cl.
CPC ......... *H04W 28/085* (2013.01); *H04W 24/10* (2013.01); *H04W 28/0268* (2013.01);
(Continued)

(58) Field of Classification Search
CPC ... H04W 28/085; H04W 76/16; H04W 24/10; H04W 28/0268; H04W 72/085;
(Continued)

(56) References Cited

U.S. PATENT DOCUMENTS

| 2008/0017518 | A1  | 1/2008 | Lorentsen et al. |
| 2013/0083661 | A1* | 4/2013 | Gupta ................ H04W 4/70 370/235 |

(Continued)

FOREIGN PATENT DOCUMENTS

| RU | 2316130 C2 | 1/2008 |
| WO | 2014000808 A1 | 1/2014 |
| WO | 2014112941 A1 | 7/2014 |

OTHER PUBLICATIONS

Office Action and Search Report and English translation thereof, dated Jun. 19, 2018 issued in corresponding Russian Application No. 2017118313/08 (031625), consisting of 14 pages.

(Continued)

*Primary Examiner* — Jay P Patel
(74) *Attorney, Agent, or Firm* — Christopher & Weisberg, P.A.

(57) ABSTRACT

Embodiments presented in this disclosure relate to methods and apparatuses (such as Access Points (AP's), evolved NodeB's (eNB's), etc.) for use in aggregation, or integration, between a Wireless Wide Area Network (WWAN) and a Wireless Local Area Network (WLAN). In one embodiment, an eNB decides that an aggregation between the WWAN and the WLAN is to be performed for at least one bearer of one or more bearers associated with a specific UE. Next, the eNB identifies which one(s) of the at least one bearer of the specific UE that is/are to be aggregated between the WWAN and the WLAN. Also, the eNB sched- (Continued)

ules each one of the at least one bearer identified to be aggregated between the WWAN and the WLAN.

30 Claims, 11 Drawing Sheets

(51) Int. Cl.
| | | |
|---|---|---|
| *H04W 24/10* | (2009.01) | |
| *H04W 28/02* | (2009.01) | |
| *H04W 72/08* | (2009.01) | |
| *H04W 76/16* | (2018.01) | |
| *H04W 28/24* | (2009.01) | |
| *H04W 84/12* | (2009.01) | |
| *H04W 88/02* | (2009.01) | |
| *H04W 88/08* | (2009.01) | |

(52) U.S. Cl.
CPC ......... *H04W 72/085* (2013.01); *H04W 76/15* (2018.02); *H04W 76/16* (2018.02); *H04W 28/24* (2013.01); *H04W 84/12* (2013.01); *H04W 88/02* (2013.01); *H04W 88/08* (2013.01)

(58) Field of Classification Search
CPC ..... H04W 76/15; H04W 84/12; H04W 88/02; H04W 88/08; H04W 28/24
See application file for complete search history.

(56) References Cited

U.S. PATENT DOCUMENTS

| | | | |
|---|---|---|---|
| 2013/0083783 A1 | 4/2013 | Gupta et al. | |
| 2013/0242897 A1* | 9/2013 | Meylan | H04W 28/16 370/329 |
| 2014/0307550 A1 | 10/2014 | Forssell et al. | |
| 2014/0369329 A1* | 12/2014 | Lee | H04W 28/06 370/338 |
| 2015/0117357 A1* | 4/2015 | Ozturk | H04W 28/0205 370/329 |
| 2015/0124743 A1* | 5/2015 | Damnjanovic | H04L 5/001 370/329 |
| 2015/0350952 A1* | 12/2015 | Ozturk | H04W 28/085 370/329 |
| 2015/0350954 A1* | 12/2015 | Faccin | H04W 76/16 370/254 |

OTHER PUBLICATIONS

International Search Report and Written Opinion dated Sep. 15, 2015 for International Application Serial No. PCT/SE2014/051304, International Filing Date: Nov. 4, 2014 consisting of 15-pages.
3GPP TS 23.261 V10.2.0 (Mar. 2012) 3rd Generation Partnership Project; Technical Specification Group Services and System Aspects; IP Flow Mobility and Seamless Wireless Local Area Network (WLAN) Offload; Stage 2 (Release 10) Mar. 9, 2012 consisting of 22-pages.

* cited by examiner

METHODS AND APPARATUS FOR INTEGRATION OF WIRELESS WIDE AREA NETWORKS WITH WIRELESS LOCAL AREA NETWORKS

CROSS-REFERENCE TO RELATED APPLICATION

This application is a Submission Under 35 U.S.C. § 371 for U.S. National Stage Patent Application of International Application Number: PCT/SE2014/051304, filed Nov. 4, 2014 entitled "METHODS AND APPARATUS FOR INTEGRATION OF WIRELESS WIDE AREA NETWORKS WITH WIRELESS LOCAL AREA NETWORKS," the entirety of which is incorporated herein by reference.

TECHNICAL FIELD

This disclosure generally relates to methods and apparatuses (such as Access points (AP's), evolved NodeB's (eNB's), etc.) for use in aggregation, or integration, between a Wireless Wide Area Network (WWAN) and a Wireless Local Area Network (WLAN).

BACKGROUND

This section is intended to provide a background to the various embodiments of the technology that are described in this disclosure. The description in this section may include concepts that could be pursued, but are not necessarily ones that have been previously conceived or pursued. Therefore, unless otherwise indicated herein, what is described in this section is not prior art to the description or claims of this disclosure and is not admitted to be prior art by its mere inclusion in this section.

As the use of mobile wireless devices (in this disclosure also interchangeably referred to as User Equipments (UEs)), such as tablet computers and smart phones, become more ubiquitous, the demands on the limited radio frequency spectrum used by these mobile wireless devices also increases. Sometimes this leads to network congestion in the licensed radio frequency spectrum. In addition, an increased use of high bandwidth applications such as audio and video streaming may increase demands beyond the capability of the available spectrum. This is especially true in high density and high use locations such as for example urban location (e.g., large cities).

Improvements in wireless architectures, hardware design, and processor speed have increased the efficiency of the mobile wireless devices in their use of the available spectrum. However, the ability to transmit a greater number of bits per second per hertz of available bandwidth may be reaching an upper limit with the currently available battery technology.

One possible way of providing additional bandwidth capacity to mobile wireless devices is through the use of an unlicensed spectrum. Many types of mobile wireless devices are capable of communicating via licensed spectrum, such as through a cellular radio network, and via unlicensed spectrum, such as via a Wi-Fi hotspot. Wi-Fi is a common name, coined by the WiFi Alliance, for an Institute of Electronics and Electrical Engineers (IEEE) 802.11 set of standards for communicating in unlicensed spectrum including e.g. the 2.4, 3.7 and 5 GHz frequency bands. The set of standards includes the IEEE 802.11a standard, the IEEE 802.11b standard, the 802.11g standard, the 802.11n standard, the 802.11-2012, and the 802.11ac standard. This list is not intended to be limiting. Additional 802.11 standards are also considered to be within the scope of this disclosure. While Wi-Fi is being given as an example of a standard used to communicate via an unlicensed portion of the radio frequency spectrum, additional standards for communicating in a portion of the unlicensed spectrum may also be used, including for instance the IEEE 802.15 family of personal area networks (PAN).

Standards such as WiFi are used to provide WLAN that can be accessed by dual mode devices (i.e. mobile wireless device having dual mode capability) that are also capable of accessing a cellular network standards such as those standardized by the $3^{rd}$ Generation Partnership Project (3GPP). Releases of the 3GPP standards include, but are not limited to, the 3GPP Long Term Evolution (LTE) and the 3GPP LTE Advanced.

Currently, WLAN is generally integrated as a separate access network to the 3GPP evolved packet core (EPC). Existing mobile wireless device based WiFi offload solutions can enable selective switching of flows based on operator or user policies. These solutions typically require the operation and maintenance of a separate WLAN radio access network, thereby generally resulting in greater operational and capital expenditures.

Recently, discussions within 3GPP has begun to focus on a tighter integration (also sometimes known as aggregation) of cellular type networks with WLANs. A tighter integration, or aggregation, of WWANs such as cellular type networks configured to use licensed portions of the radio spectrum, with WLANs designed to use unlicensed portions of the radio spectrum, may substantially improve performance. For example, the integration of 3GPP access network components, such as the eNodeB (eNB) with the WLAN access networks may enable a dual mode capable mobile wireless device to use the licensed and unlicensed portions of the spectrum with minimal impact to the 3GPP core network elements. Such solution may in turn improve the overall user experience without degrading the quality of service (QoS), mobility, security, and/or power management when capacity is expanded to the unlicensed spectrum. Changes to the WLAN access network may be kept to a minimum as well, with preferably no changes to the WLAN air interface.

For example, the U.S. Patent Application Publication No. 2013/0083783 A1 is concerned with Multi-RAT Carrier Aggregation for Integrated WWAN and WLAN Operation.

SUMMARY

It is in view of these considerations and others that the various embodiments of this disclosure have been made. It is therefore a general object of the embodiments disclosed herein to provide improved method and apparatuses (e.g., AP's, eNB's, etc.) for use in aggregation (or, integration) between a WWAN and a WLAN.

According to an aspect of embodiments disclosed herein, this general object is addressed by a method according to the independent claim 1. According to another aspect of embodiments disclosed herein, the general object is addressed by a method according to the independent claim 13, or the independent claim 18. According to yet another aspect of embodiments disclosed herein, the general object is addressed by a network element of a WWAN according to the independent claim 24 or 25 and/or by a network element of a WLAN according to the independent claim 27, 28, 29 or 30. Advantageous embodiments are defined in the appended dependent claims.

Thus, and according to one of its aspects, the technology disclosed herein concerns a method for use in aggregation between a WWAN (e.g., 3GPP LTE) and a WLAN (e.g., Wi-Fi). This method may be performed by a network element of the WWAN, such as an eNB. The method may comprise the actions, or methods steps of: deciding that an aggregation between the WWAN and the WLAN is to be performed for at least one bearer of one or more bearers associated with a specific UE; identifying which one(s) of said at least one bearer associated with said specific UE that is/are to be aggregated between the WWAN and the WLAN; and packet-level scheduling of each one of said at least one bearer identified to be aggregated between the WWAN and the WLAN.

According to another of its aspects, the technology disclosed herein concerns a method for use in aggregation between a WWAN and a WLAN. This method may be performed by a network element of the WLAN, such as a WLAN AP. The method may comprise the action, or method step of: receiving, from a network element of the WWAN (e.g. the eNB), information related to a mapping, wherein said mapping is a mapping of a set of WWAN QoS attributes for each bearer in the WWAN with corresponding WLAN QoS attributes in the WLAN.

According to still another of its aspects, the technology disclosed herein concerns a method for use in aggregation between a WWAN and a WLAN. This method may be performed by a network element of the WLAN, such as a WLAN AP. This method may comprise receiving, from a network element of the WWAN, information related to a set of WWAN QoS attributes for each bearer of at least one bearer identified to be aggregated between the WWAN and the WLAN.

According to still further aspects, the technology disclosed herein relates to corresponding apparatuses (i.e. network elements of the WWAN and the WLAN, respectively) for implementing the methods according to the above-mentioned aspects.

Still further, the technology disclosed herein relates to computer program, comprising instructions which, when executed on at least one processor, cause the at least one processor to carry out any one of the methods described hereinabove. A carrier containing said computer program may also be provided. The carrier may be one of an electronic signal, optical signal, radio signal, or computer readable storage medium.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

Figure 1A:
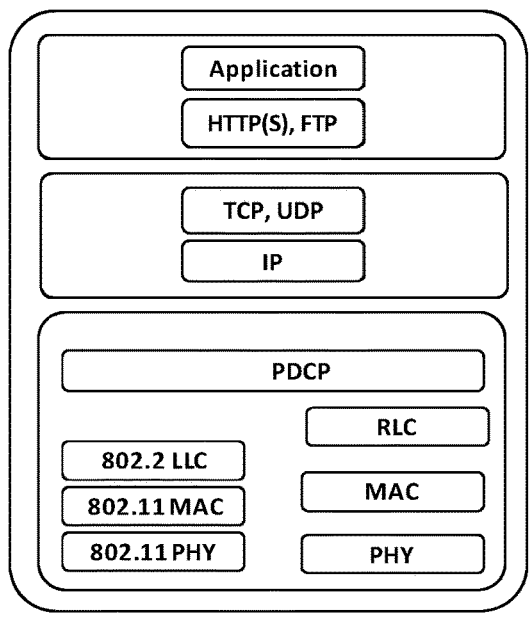
FIGS. 1A-1C illustrate different levels of integration, or aggregation, of a WWAN (e.g. 3GPP LTE) and a WLAN (e.g. Wi-Fi) at the UE side.

The technology will now be described more fully hereinafter. The technology may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps (or actions) throughout the description.

Prior to discussing the various embodiments, this disclosure will present a background to the various embodiments in an attempt to facilitate the reading and understanding of the subsequently discussed embodiments.

WWAN/WLAN Interworking

Most current WLAN deployments are separate from WWANs (such as cellular networks standardized by the 3GGPP) and can be seen as non-integrated from the perspective of the mobile wireless devices (a.k.a. UEs). Most operating systems for mobile wireless devices support a WLAN offloading mechanism where the mobile wireless device may be operable to immediately switch all of its Internet Protocol (IP) traffic to a WLAN network upon a detection of a suitable WLAN network having received signal strength above a certain level. In the following, the decision as to whether or not to offload to a WLAN may be referred to as "access selection strategy". Also, the term "WLAN-if-coverage" may be used herein to refer to the aforementioned access selection strategy of selecting WLAN whenever such a network is detected.

The inventors have realized that there may exist drawbacks associated with the "WLAN-if-coverage" access selection strategy, for example:

Even if the mobile wireless device may store previous pass codes for already accessed WLAN APs, hotspot login for previously non-accessed APs usually requires user intervention, either by entering the pass code in WLAN Connection Manager (CM) of the mobile wireless device or by using a web interface.

Generally speaking, no consideration of expected user experience is made except those considered in the implemented proprietary solution of the mobile wireless devices. This may lead to a situation where a mobile wireless device is handed over from a high data rate network connection to a low data rate WLAN connection. Even if the operating system of the mobile wireless device, or some high level software of the mobile wireless device, were sufficiently intelligent to make the offload decisions only when the signal level on the WLAN is considerably better than the network link of the WWAN, there may still be limitations at the backhaul of the WLAN AP that may end up being a bottleneck.

Generally speaking, no consideration of the load conditions in the WWAN and WLAN are made. As such, the mobile wireless device might still be offloaded to a WLAN AP that is serving several mobile wireless devices while the WWAN (e.g. LTE) that it was previously connected to is rather unloaded.

Interruptions of on-going services may occur due to the change of IP address when the mobile wireless device switches to the WLAN. For example, a user who started a Voice over IP (VoIP) call while connected to a WWAN is likely to experience a call drop when arriving at home and the mobile wireless device switches to the WLAN automatically. Even if some applications are intelligent enough to handle this situation and survive the IP address change (e.g., Spotify®), the majority of current applications do not. This may place an unnecessary burden on application developers if they have to ensure service continuity.

Generally speaking, no consideration of the mobility of the mobile wireless device is made. Due to this fact, a fast moving mobile wireless device may end up being offloaded to a WLAN AP for a short duration, just to be handed over back to the WWAN. This may be a particular challenge in scenarios where e.g. cafés offer open WLAN (e.g., open Wi-Fi), where a user walking by or even driving by the café might be affected by this. Such ping pong between the WLAN and WWAN may, in some scenarios, cause service interruptions as well as generate considerably unnecessary signaling (e.g., towards authentication servers).

Radio Access Network (RAN) Level Integration (Release 12)

3GPP is working on specifying a mechanism for WLAN/WWAN which improves operator control with respect to how a mobile wireless device performs access selection and traffic steering between WWANs and WLANs belonging to the operator or its partners. For this mechanism, it is discussed that the RAN could provide assistance parameters that assist the mobile wireless device in the access selection. The RAN assistance information may e.g. be composed of three main components, namely threshold values, offloading preference indicator (OPI) and WLAN identifiers. The mobile wireless device may also be provided with RAN rules and/or policies that make use of these assistance parameters.

The threshold values could for example be metrics such as 3GPP signal related metrics, such as RSRP (Reference Signal Received Power), RSRQ (Reference Signal Received Quality), RSCP (Received Signal Code Power), and/or Ec/No, all of which are conventional and known in the art. On the WLAN side, corresponding WLAN signal related metrics may e.g. include RCPI (Received Channel Power Indicator) and/or RSSI (Received Signal Strength Indication), WLAN load/utilization, WLAN backhaul load/capacity, etc.

One example of a RAN rule that could use the threshold value may be that the mobile wireless device should connect to a WLAN if the RSRP is below the signaled RSRP threshold at the same time as the WLAN RCPI is above the signaled RCPI threshold. The RAN rules and/or policies are expected to be specified in a 3GPP specification such as, for example, 3GPP TS 36.304 and/or 3GPP TS 36.331.

With the above mechanism it is likely not wanted, or maybe not even feasible, that the mobile wireless device considers any WLAN when deciding where to steer traffic. For example, it may not be feasible that the mobile wireless device uses this mechanism to decide to steer traffic to a WLAN not belonging to the operator. Hence it has been proposed that the RAN should preferably (though not necessarily) also indicate to the mobile wireless device which WLANs the mechanism should be applied for by sending WLAN identifiers.

Optionally, the RAN may also provide additional parameters which are used in ANDSF (Access Network Discovery and Selection Function) policies. One proposed parameter is offloading preference indicator (OPI). For example, one possibility for OPI is that it is compared with a threshold in the ANDSF policy in order to trigger different actions. Another possibility is that OPI is used as a pointer to point and, and thereafter select, different parts of the ANDSF policy which would then be used by the mobile wireless device.

The RAN assistance parameters (i.e. thresholds, WLAN identifiers, OPI) provided by the RAN may be provided with dedicated signaling and/or via broadcast signaling. Dedicated parameters may typically only be sent to the mobile wireless device when the mobile wireless device is having a valid RRC (Radio Resource Control) connection to the 3GPP RAN. A mobile wireless device which has received dedicated parameters may apply the dedicated parameters; otherwise the terminal may apply the broadcast parameters. If no RRC connection is established between the mobile wireless device and the RAN, the mobile wireless device cannot generally receive dedicated parameters.

In 3GPP, it has been agreed that ANDSF should be enhanced for release-12 to use the thresholds and OPI parameters that are communicated by the RAN to the mobile wireless device. Also, if enhanced ANDSF policies are provided to the mobile wireless device, the mobile wireless device will use the ANDSF policies instead of the RAN rules/policies (i.e. ANDSF has precedence).

Tight Integration Between WWAN and WLAN (Release 13)

Within the scope of 3GPP Release-13, there has been a growing interest in realizing even tighter integration, or aggregation, between WWAN (e.g. 3GPP LTE) and WLAN. Such an aggregation is expected to make it possible for a an improved aggregation opportunity as compared to MPTCP (Multipath TCP, TCP is an abbreviation for Transmission Control Protocol), as the aggregation is performed at a lower protocol layer and as such the scheduling and flow control of the data on the WLAN and WWAN links may be controlled by considering dynamic radio network conditions.

Figure 1B:
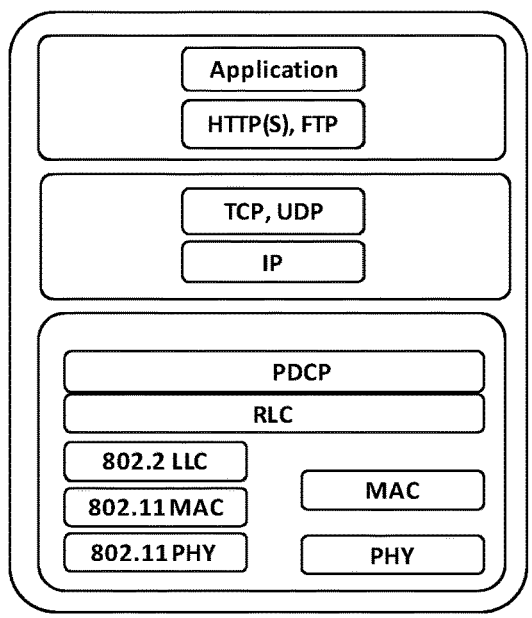
Figure 1C:
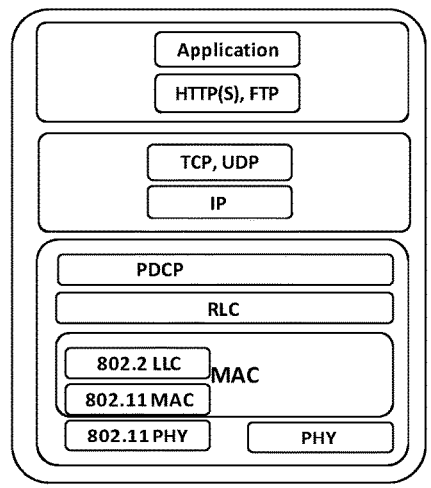

FIGS. 1A-1C illustrates three different protocol options of aggregation at the PDCP (FIG. 1A), RLC (FIG. 1B) and MAC (FIG. 1C) levels. As is known among persons skilled in the art, PCDP is an abbreviation for Packet Data Convergence Protocol, RLC is an abbreviation for Radio Link Control, and MAC is an abbreviation for Medium Access Control.

FIGS. 1A-1C illustrate the main principles for these three aggregation levels and additional functionality may be advantageously utilized. For example, at the PDCP-level aggregation, an additional protocol layer may be used between the PDCP layer and the 802.2 LLC layer to convey information about the mobile wireless device and the radio bearer the traffic is associated with (this additional protocol layer is referred to as "Glue-1" in FIGS. 2A and 2B, to be explained later herein).

Figure 2A:
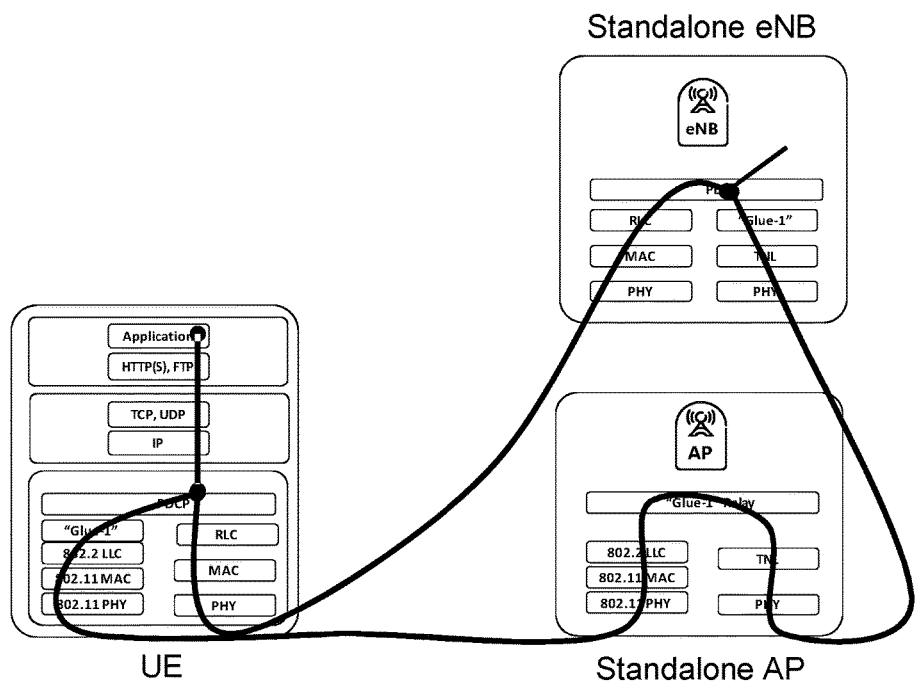
FIG. 2A illustrates an exemplary way of PDCP level aggregation for a standalone AP and eNB.
Figure 2B:
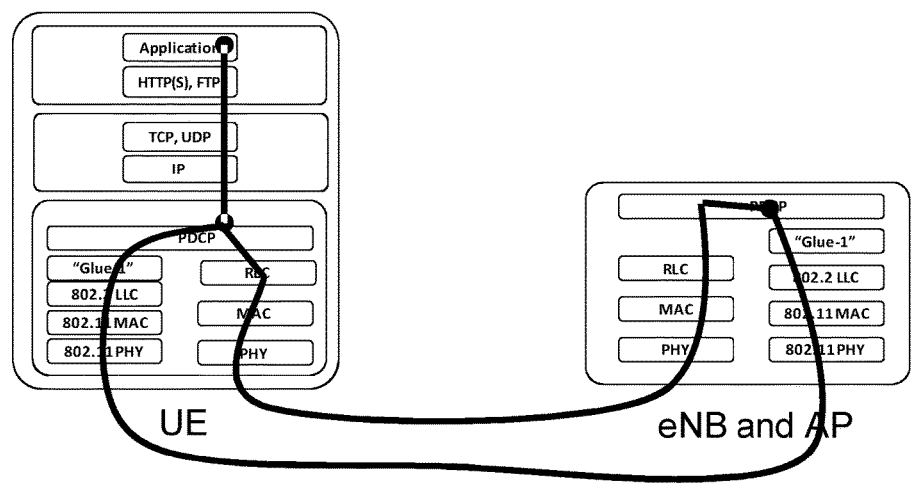
FIG. 2B illustrates an exemplary way of PDCP level aggregation for a co-located (e.g., combined) AP and eNB.

It should be appreciated by those persons skilled in the art that FIGS. 1A-1C are showing the protocol stacks at a mobile wireless device. In the case of a standalone AP and eNB (i.e., the AP and the eNB are non co-located), the protocol stack for supporting aggregation may be slightly different, as the PDCP protocol messages, or "Glue-1" protocol messages carrying PDCP protocol messages, may have to be relayed towards the standalone eNB. FIG. 2A schematically illustrates this scenario for the case of PDCP level aggregation. In this case, once the LLC packet is decoded at the AP (in the uplink direction from the mobile wireless device to the AP), and the AP realizes that this packet is a "Glue-1" protocol message carrying PDCP protocol message, or a PDCP protocol message, that has to be routed to an eNB, the forwarding can be performed for example via normal TCP/IP protocol stack. The downlink direction is similar i.e. once the eNB decides that a PDCP protocol message is to be aggregated over WLAN, the PDCP protocol message may be either put into "Glue-1" protocol message and sent to the correct AP using for example normal TCP/IP protocol stack, or the PDCP protocol message may be sent without "Glue-1" protocol to the correct AP using for example a normal TCP/IP protocol stack. On the contrary, FIG. 2B shows PDCP level aggregation with a co-located eNB and AP (i.e., the AP and the eNB are combined, thus co-located).

QoS in WWAN and in WLAN

Many services and subscribers may share the same radio and network resources. Real-time services (e.g., voice, video etc.) may be sharing the same resources as non-real-time services (e.g., Internet browsing, file download, etc). A potential challenge in this area is how to ensure QoS (e.g., bit rates, packet delays, packet loss) for Real Time Services. 3GPP Evolved Packet System, EPS (i.e. both Evolved Universal Terrestrial Radio Access Network, E-UTRAN and Evolved Packet Core, EPC) generally provides efficient QoS mechanisms to ensure that the user experience of different services sharing the same resources is acceptable. Examples of such mechanisms provided in 3GPP are:

1. Traffic Separation: Different traffic types receive different treatment (queuing, etc.) in network;
2. 3GPP provides for both relative QoS and absolute QoS (using Guaranteed Bit Rates);
3. GBR (Guaranteed Bit Rate) based admission control is used to reserve resources before traffic is admitted into the network or rejected otherwise;
4. Policy (PCC) determines what treatment to apply to the traffic streams 3GPP defines the concept of a PDN, i.e. a Packet Data Network. A PDN is in most cases an IP network, e.g. Internet or an operator IMS service network. A PDN has one or more names; each name is defined in a string called APN (Access Point Name). The PGW is a gateway towards one or more PDNs. A mobile wireless device may have one or more PDN connections. A PDN connection is a logical IP tunnel between mobile wireless device and PGW, providing the mobile wireless device access to a PDN. The setup of a PDN connection is initiated from the mobile wireless device.

Every PDN connection consists of one or more bearers, see e.g. the 3GPP TS 23.401 section 4.7.2 for a description of the bearer concept. A bearer uniquely identifies traffic flows that receive a common QoS treatment between a mobile wireless device and a PGW. Each bearer on a particular access has a unique bearer identity (ID). At the 3GPP access, the bearer is end-to-end between mobile wireless device and PGW. Every PDN connection has at least one bearer and this bearer is called the default bearer. All additional bearers on the PDN connection are called dedicated bearers.

There are two types of bearers: GBR and non-GBR bearers. Every EPS bearer is associated with the following QoS parameters: QoS Class Identifier (QCI) and Allocation and Retention Priority (ARP). In addition, GBR bearers are associated with bit rate parameters for Guaranteed Bit Rate (GBR) and Maximum Bit Rate (MBR). Non-GBR bearers do not have bearer-level bit rate parameters. Instead, there is aggregate enforcement of all non-GBR bearers using Aggregate Maximum Bit Rates (AMBR) (APN-AMBR: defined per subscriber and Access Point Name, and UE-AMBR: defined per subscriber).

The underlying protocols for QoS over Wi-Fi were standardized several years ago, and enterprise wireless LANs now incorporates the relevant standards. Wi-Fi Multi-Media (WMM) was first standardized as 802.11e in 2005. 802.11e introduces support for radio prioritization of 4 different access categories (e.g., Voice, Video, BE, Background). Support for 802.11e is also covered by the WMM certification in WFA. A typical usage for these Access Categories is based on IP Differentiated Services Code Point (DSCP) marking of packets.

Wi-Fi uses carrier-sense, multiple-access with collision avoidance (CSMA/CA) as the medium access principle. Prior to transmitting a frame, CSMA/CA generally requires each device to monitor the wireless channel for other Wi-Fi transmissions. If a transmission is in progress, the device sets a back-off timer to a random interval, and tries again when the timer expires. Once the channel is clear, the device waits a short interval—the arbitration inter-frame space—before starting its transmission. Since all devices follow the same set of rules, CSMA/CA ensures "fair" access to the wireless channel for all Wi-Fi devices.

The WMM adjusts two CSMA/CA parameters, the random back-off timer and the arbitration inter-frame space, according to the QoS priority of the frame to be transmitted. High-priority frames are assigned shorter random back-off timers and arbitration inter-frame spaces, while lower priority frames must wait longer. WMM thereby gives high-priority frames a much higher probability of being transmitted sooner.

Challenges

The inventors have realized that the tighter integration, or aggregation, between WWAN and WLAN solutions is typically based on the normal 3GPP QoS architecture. Traffic for different users is generally mapped towards bearers with different QoS attributes in the EPC. The QoS attributes are made known in the eNB using signaling procedures between the EPC and the eNB. Therefore the eNB is normally aware of the specific QoS related requirements for every such bearer. A new challenge arises due to the nature of the tight integration solutions, since parts of the traffic may be sent over the WLAN. However, the WLAN side generally has no knowledge about the QoS requirements signaled for the traffic from EPC to the eNB. This may impact the ensuring of these QoS requirements.

This issue of mapping the QoS in EPC and WLAN has been addressed in the earlier-mentioned US 2013/0083783 A1 to some extent. For example, US 2013/0083783 A1 proposes a method for sending a traffic steering command to the mobile wireless device that also includes a mapping table specifying to what WLAN QoS the different bearers of the bearers that have to be steered to WLAN have to be mapped to. However, in US 2013/0083783 A1 only traffic steering is considered. Also, the mapping mainly focuses on UL traffic. The mapping information is sent to the mobile wireless device and the mobile wireless device can only influence the mapping of the UL flows to the proper WLAN QoS parameters. Moreover, US 2013/0083783 A1 addresses only the case of a dual mode eNB that has both cellular and WLAN radio units. That is, US 2013/0083783 A1 is not concerned with scenarios where aggregation is to be performed between a standalone eNB and standalone WLAN AP. This is however recognized by the technology that is described in this disclosure.

With reference to FIGS. 3 through 6, various embodiments of improved methods and apparatuses (e.g. WLAN AP's 200 and eNB's 300) for integration, or aggregation, of a WWAN (e.g. 3GPP LTE) and a WLAN (e.g., Wi-Fi) will be described in detail. As will be appreciated, the various embodiments enable the usage of the 3GPP QoS requirements also over the WLAN link. For example, the network element of the WWAN (e.g. eNB 300) signals information to be used for applying QoS in the WLAN link to a network element of the WLAN (typically an AP 200) for downlink (DL) data packets. For instance, the signaled information may be the 3GPP QoS requirements known by the eNB 300, or a mapping of these 3GPP QoS requirements to corresponding WLAN specific QoS attributes. The AP 200 then uses the received information in the DL direction of the WLAN link. Common for all embodiments that will be discussed with respect to FIGS. 3-6 is that every bearer (at the WWAN side) is typically associated with a set of QoS attributes. The set of QoS attributes may include one or more of the following: QoS Class Identifier (QCI), Allocation and Retention Priority (ARP), Guaranteed Bit Rat (GBR), Maximum Bit Rate (MBR), and Aggregate Maximum Bit Rates (AMBR). As used in this disclosure, the set of QoS attributes for a bearer (i.e., for a specific mobile wireless device) may interchangeably be referred to either as "QoS Profile" or as "WWAN QoS attributes". In addition, a network element of the WWAN such as the eNB 300 may allocate a Logical Channel Identifier (LCID) for every bearer, e.g. at the MAC layer. This LCID may be used in communications between the eNB 300 and the mobile wireless device 100, and is also one example for indicating a specific bearer in the case some traffic is sent over the tightly integrated WLAN radio link. In this case, one possible solution is to include also the LCID in every data packet sent over the WLAN radio link. Another possibility for including the LCID in the communication between the mobile wireless device and the eNB 300 (e.g., via the WLAN AP 200) is to include it as part of the "Glue-1" protocol shown in FIGS. 2a and 2b. This means that for every packet sent from the eNB 300 to the mobile wireless device 100 (e.g., via WLAN AP 200) the eNB 300 may add the LCID in a specific "Glue-1" protocol header. The mobile wireless device 100 may do the same in the uplink direction. Finally, there may be a need to know for which mobile wireless device 100 a specific communication over WLAN belongs to. For this purpose, a specific "UE identifier" which identifies the mobile wireless device 100 may advantageously also be included in the "Glue-1" protocol header by both the eNB 300 and the mobile wireless device 100. This "UE identifier" may e.g. comprise C-RNTI (Cell Radio Network Temporary Identifier) and cell-id.

Figure 3:
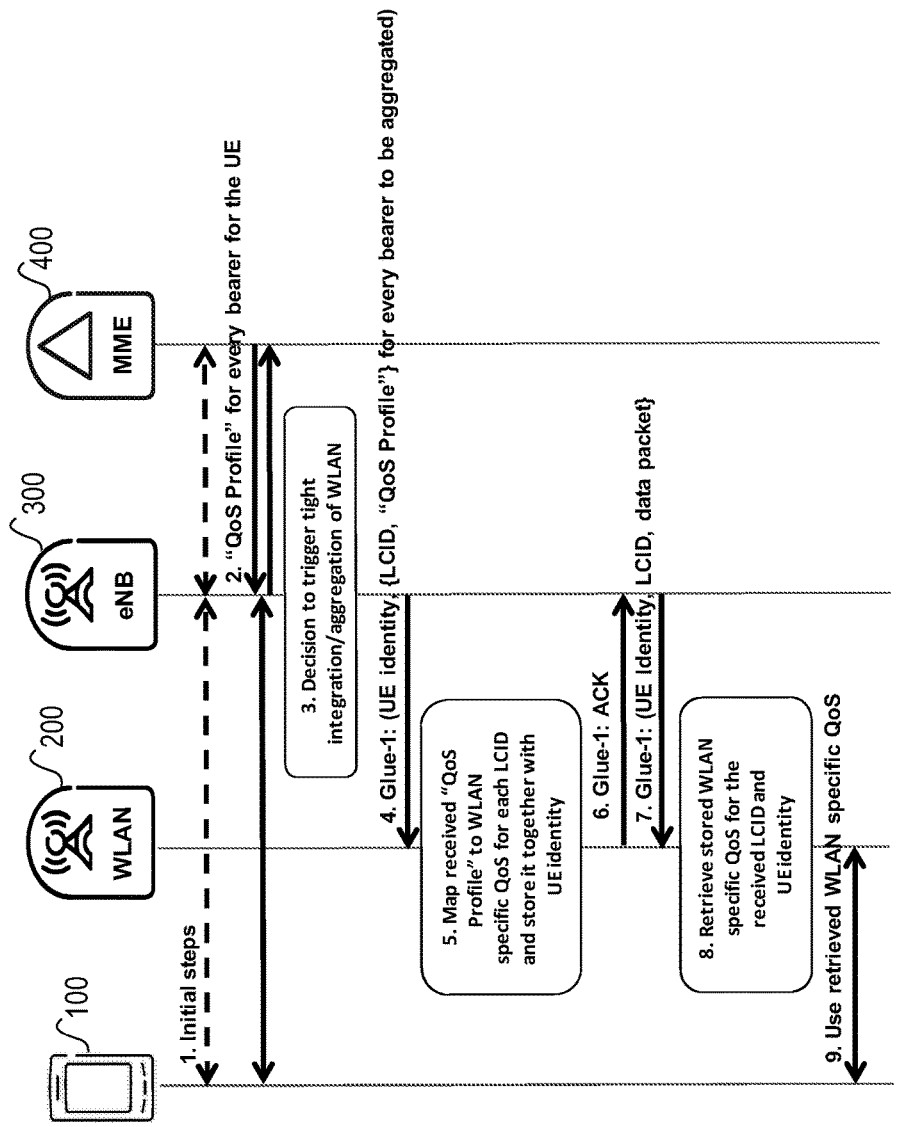
FIG. 3 is a signaling diagram showing message sequences according to an embodiment.
Figure 4:
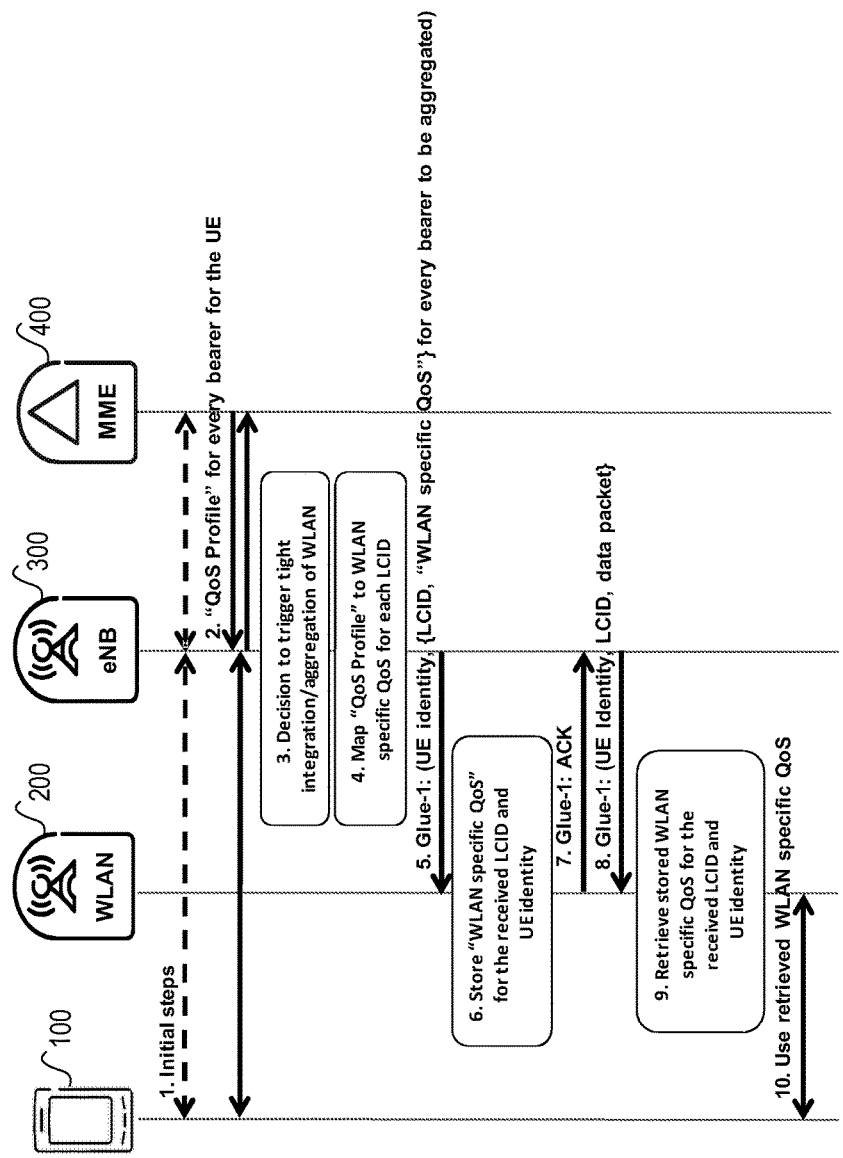
FIG. 4 is a signaling diagram showing message sequences according to another embodiment.

FIGS. 3 and 4 show two different embodiments for the DL direction. In the first embodiment described in FIG. 3, a "QoS Profile" is sent from the eNB 300 to the WLAN side where it is mapped to WLAN specific QoS configuration. The second embodiment described in FIG. 4 is similar to the first embodiment shown in FIG. 3. However, in the second embodiment, the eNB 300 performs the mapping from "QoS Profile" to the WLAN specific QoS configuration and then sends this mapping to the WLAN side.

Embodiment 1

The first embodiment shown in FIG. 3 will now be described in further detail:

Action 1: Initial steps take place between the mobile wireless device 100, eNB 300 and the EPC. For EPC, only the Mobility Management Entity (MME) 400 is shown for clarity. However, other EPC nodes may also be involved as is appreciated by those skilled in the art. These initial steps may include attachment of the mobile wireless device 100 to the EPC, PDN connection establishment signaling and any other NAS (Non-Access Stratum) signaling.

Action 2: The MME configures a set of bearers in the eNB. This step may e.g. start with the transmission of (S1AP) INITIAL CONTEXT SETUP REQUEST from the MME 400 to the eNB 300. A list of bearers may be included in the message and a "QoS Profile" may be included for each bearer. The eNB 300 may store the received set of bearers and the associated "QoS Profile". Additional signaling may also take place between the mobile wireless device 100 and the eNB 300 (e.g., configuration of LCID for each bearer), and finally eNB 300 may reply to the MME 400.

Action 3: It is decided (e.g., by the eNB) that the mobile wireless device 100 should start aggregating traffic over WLAN, and aggregation initiation may be performed between the eNB 300, mobile wireless device 100, and AP 200. This decision may apply for all, or only a subset of all the bearers, for the mobile wireless device 100.

Action 4: The eNB triggers the configuration of the WLAN QoS for each bearer that is to be aggregated over WLAN. The eNB 300 may send a "Glue-1" protocol message to the AP 200 indicating both the LCID and "QoS profile" for every bearer that can be aggregated. The "UE identity" may also be included in the message. This may be a specific "Glue-1" protocol message that is terminated at the WLAN side (i.e., it is not necessarily sent to the mobile wireless device 100).

Action 5: The WLAN side (e.g., the WLAN AP 200) maps the received "QoS Profile" for each LCID (and bearer) to corresponding WLAN QoS attributes and stores the information together with the UE ID. The mapping may be based on any information included in the received QoS profile. For example, any combination of QCI, ARP, GBR, MBR and AMBR may be used depending on the information that is included in the "QoS Profile" (e.g., different information for GBR-bearers and non-GBR-bearers as described previously).

Action 6: The WLAN side (e.g., the AP 200) may send an acknowledgement to the eNB.

Action 7: The eNB 300 sends a data packet using tight WLAN integration/aggregation to the WLAN side (e.g., the AP 200) using a "Glue-1" protocol message. The message may e.g. comprise the UE identity, the LCID and the data packet. This action, or method step, may occur after (e.g., substantially immediately after) a packet-scheduling.

Action 8: The WLAN side retrieves the corresponding WLAN QoS attributes stored for the LCID and UE identifier.

Action 9: The WLAN side uses the retrieved WLAN QoS configuration in the communication towards the UE.

The first embodiment shown in FIG. 3 is an example of a "tunneled approach". In this approach, there is an initial signaling between the eNB 300 and the AP 200 before any user data is transmitted. The initial signaling is typically used to establish an association (or a tunnel) between the eNB 300 and the AP 200 for "UE ID" and "LCID" and the "QoS Profile" mapped to WLAN QoS attributes on the WLAN side.

Embodiment 2

The second embodiment shown in FIG. 4 will now be described in further detail:
Action 1: Same as Action 1 in FIG. 3.
Action 2: Same as Action 2 in FIG. 3.
Action 3: Same as Action 3 in FIG. 3.
Action 4: The eNB 300 triggers the configuration of the corresponding WLAN QoS for each bearer that is to be aggregated over WLAN. The eNB 300 maps the "QoS Profile" for each LCID (and bearer) to corresponding "WLAN QoS" attributes.
Action 5: The eNB 300 sends a "Glue-1" protocol message to the AP 200 indicating both the LCID and "WLAN QoS" for every bearer that can be aggregated. The "UE identity" may also be included in the message. This may be a specific "Glue-1" protocol message that is terminated in the WLAN side (i.e. not sent to the UE).
Action 6: The WLAN side stores the received "WLAN specific QoS" for each LCID together with the UE identifier.
Action 7: Same as Action 6 in FIG. 3.
Action 8: Same as Action 7 in FIG. 3.
Action 9: Same as Action 8 in FIG. 3.
Action 10: Same as Action 9 in FIG. 3.

The second embodiment shown in FIG. 4 is also an example of the "tunneled approach". In this approach, there is an initial signaling between the eNB 300 and the AP 200 before any user data is transmitted. The initial signaling is typically used to establish an association (or a tunnel) between the eNB 300 and the AP 200 for "UE ID" and "LCID" and the WLAN QoS attributes to be used on the WLAN side.

Other examples of the "tunneled approach" are also conceivable and the first and second embodiment should therefore be seen as examples of this approach. For example, the tunnel could also be established so that WLAN QoS attributes to be used are initially configured in the AP 200 as part of the tunnel establishment. In addition, a tunnel identifier may be configured as part of the establishment and then the tunnel may be used for user data transmission via the WLAN AP 200. In such scenario, no specific UE ID or LCID would need to be included in the "Glue-1" protocol message.

It should be appreciated that "Glue-1" protocol referred to hereinabove may be a new protocol or it could, for example, be an enhancement of a protocol used over the X2-WLAN interface between WLAN and 3GPP.

In addition to the first and the second embodiments, it would also be possible to include the "QoS Profile" or the corresponding "WLAN specific QoS" in the Glue-1 data packets. This would mean that there is no initial configuration signaling between the eNB 300 and the WLAN side. This is further illustrated in FIGS. 5 and 6, which schematically illustrate third and fourth embodiments respectively.

Embodiment 3

Figure 5:
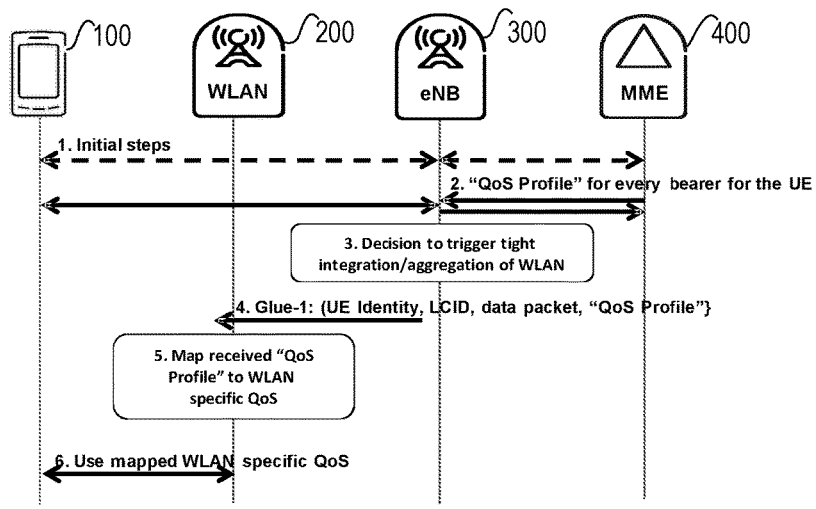
FIG. 5 is a signaling diagram showing message sequences according to still another embodiment.

A third embodiment will now be discussed reference being made to FIG. 5:
Action 1: Same as Action 1 in FIG. 3.
Action 2: Same as Action 2 in FIG. 3.
Action 3: Same as Action 3 in FIG. 3.
Action 4: Same as Action 7 in FIG. 3, but the message additionally comprises the "QoS profile".
Action 5: Same as Action 5 in FIG. 3, except that this is done for every data packet and no mapping is stored.
Action 6: Same as Action 9 of FIG. 3, except that the WLAN QoS configuration is the one mapped in Action 5 (of FIG. 5) and not the retrieved one.

Embodiment 4

Figure 6:
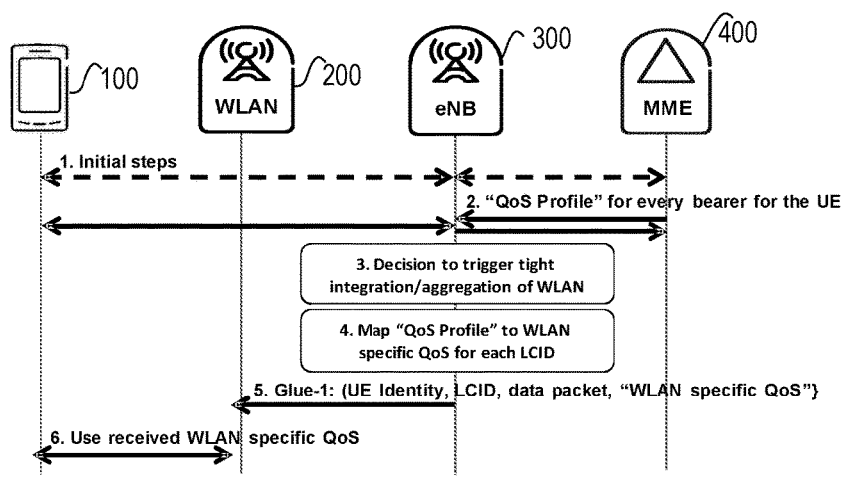
FIG. 6 is a signaling diagram showing message sequences according to yet another embodiment.

A fourth embodiment will now be discussed reference being made to FIG. 6:
Action 1: Same as Action 1 in FIG. 4.
Action 2: Same as Action 2 in FIG. 4.
Action 3: Same as Action 3 in FIG. 4.
Action 4: Same as Action 4 in FIG. 4.
Action 5: Same as Action 8 of FIG. 4, but the message additionally comprises the "WLAN QoS profile"
Action 6: Same as Action 10 of FIG. 4, except that here the received profile is directly used and no retrieving is necessary.

Still another embodiment, i.e. a fifth embodiment, may also be conceivable. In a fifth embodiment, there is no specific configuration step between the eNB 300 and WLAN side. There is neither any "QoS Profile" nor the "WLAN specific QoS" included in the Glue-1 data packets. Instead, the eNB 300 ensures that the same LCID can be used for all bearers that have the same, generally the same or similar QoS requirements. In this case, the WLAN side may be preconfigured with LCID to corresponding "WLAN specific QoS" mappings. When the eNB 300 sends a data packet to the WLAN side it may comprise the UE ID, the LCID and the data packet. Then the LCID can be used to select the preconfigured "WLAN specific QoS".

The awareness of the 3GPP QoS requirements on the WLAN side enables additional functionality. The WLAN side may use this information for the communication over the interface towards the eNB 300, for example to prioritize the traffic from many users. In case of a high load on this interface, the AP 200 may prioritize the traffic with high QoS over traffic with low QoS. Also, the AP 200 could use the interface to the eNB 300 to signal what was the actual WLAN QoS used for a specific data packet. The eNB 300 could then use this knowledge to decide if tight integration/aggregation should be continued in that WLAN AP 200.

Figure 7A:
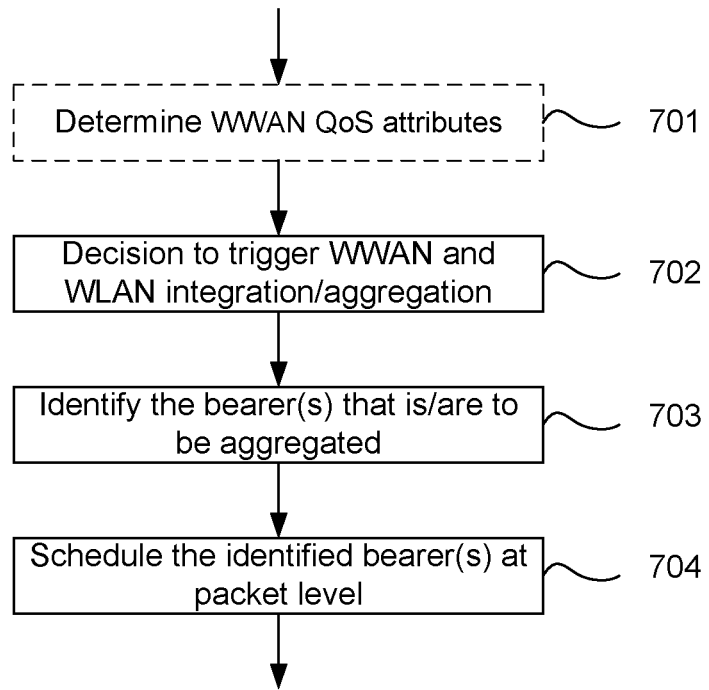
FIGS. 7A-7B are flowcharts of an embodiment of a method performed by a network element of a WWAN, e.g. an eNB.

Turning now to FIG. 7, a method performed by a network element of the WWAN, e.g. the eNB 300, will be described. This method may be used for implementing the embodiments described with reference to FIGS. 3-6, i.e. the method is for use in aggregation (or, integration) between a WWAN (e.g., 3GPP LTE) and a WLAN (e.g., Wi-Fi). In the following, the network element of the WWAN will be exemplified as an eNB and the network element of the WLAN will be exemplified as an AP of the WLAN in order to facilitate the reading of the disclosure.

As can be seen in FIG. 7, the eNB 300 may optionally determine 701 a set of WWAN QoS attributes ("QoS profile") for each bearer of one or more bearers associated with a specific UE. In some embodiments, the eNB 300 may determine the WWAN QoS attributes by receiving the WWAN QoS attributes from another WWAN network element (e.g., the MME 400). For example, the MME 400 may transmit a message to the eNB 300, wherein said message includes said WWAN QoS attributes for each bearer for the UE. Accordingly, the eNB 300 may receive the message including said WWAN QoS attributes from the MME 400. The eNB may also already have the WWAN QoS attributes stored e.g. in a memory unit/module.

The eNB decides 702 or otherwise establishes that aggregation between the WWAN and the WLAN is to be performed for at least one bearer of one or more bearers associated with a specific UE. In other words, the eNB decides 702 that tight aggregation (or, integration) between the WWAN and the WLAN is to be used.

The decision to initiate aggregation (or, integration) could for example be based on the radio condition and/or load conditions in the WWAN and WLAN, for example, when the signal level between the WWAN and the UE falls below a certain threshold and/or when the signal level between the WLAN and the UE rises above another threshold. Additionally, or alternatively, the decision to initiate aggregation could be based on UE capabilities in the WWAN and/or WLAN, the eNB and/or AP capabilities, UE activity/traffic volume and/or any subscription based information received from the MME, such as the Subscribed Profile Identity (SPID).

Moreover, the eNB 300 may identify 703 one(s) of said at least one bearer of said specific UE that is/are to be aggregated between the WWAN and the WLAN. In some embodiments, only a subset of all bearers of said specific UE is/are to be aggregated between the WWAN and the WLAN. In other embodiments, all bearers of said specific UE is/are to be aggregated between the WWAN and the WLAN.

This identification could for example be based on the radio conditions and/or load conditions in the WWAN and WLAN. Additionally, or alternatively, the identification could be based on the QoS requirements of the bearers. For example, some bearers may not be selected for aggregation because they have very strict QoS requirements, or selected for aggregation only if the radio conditions in the WLAN are exceptionally good, while bearers with more "relaxed" QoS requirements may be selected for aggregation even if the radio conditions in WLAN are not that sufficiently good.

Subsequently, each one of said at least one bearer identified to be aggregated between the WWAN and the WLAN are packet-level scheduled 704. That is, the eNB 300 may schedule 704, at packet level, each one of said at least one bearer that has/have been identified 703 to be aggregated between the WWAN and the WLAN. In one example, the eNB 300 may perform packet-level scheduling for each downlink packet received from the Serving Gateway (SGW) associated with a bearer that has been identified 703 to be aggregated between the WWAN and the WLAN.

Figure 7B:
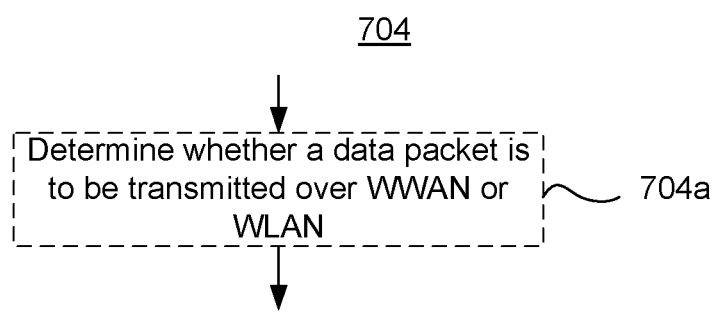

In some embodiments, which are illustrated in FIG. 7B, the packet-level scheduling 704 may optionally comprises determining 704a, for each data packet, whether the data packet is to be transmitted over the WWAN or the WLAN. For example, the determining 704a, for each data packet, whether the data packet is to be transmitted over the WWAN or the WLAN may be based on information related to load of WWAN radio cells and WLAN radio cells. Additionally, or alternatively, the determining 704a, for each data packet, whether the data packet is to be transmitted over the WWAN or the WLAN may be based on information related to radio measurements of WWAN radio cells and WLAN radio cells for the UE.

Figure 8:
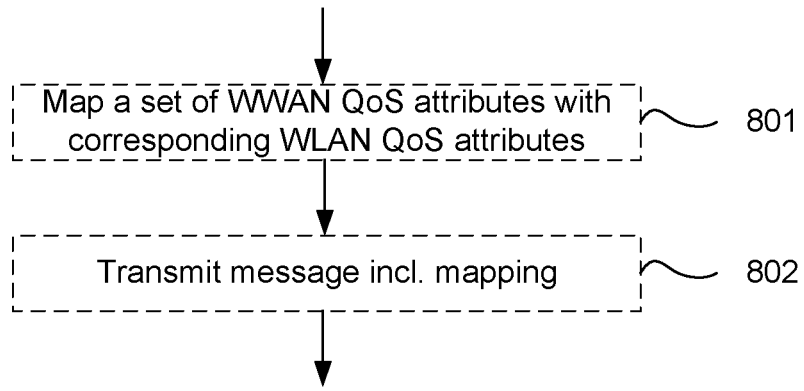
FIG. 8 is a flowchart of an embodiment of a method performed by a network element of a WWAN, e.g. an eNB.

Turning now to FIG. 8, additional optional actions, or steps, that may be performed by the eNB 300 will be described. For example, the eNB 300 may map 801 a set of WWAN QoS attributes for each bearer in the WWAN with corresponding WLAN QoS attributes in the WLAN. This may be performed for each one of said at least one bearer being identified to be aggregated between the WWAN and the WLAN. This mapping may be included in a message. The message including the mapping may then be transmitted 802 to a network element of the WLAN, typically the AP 200 (see e.g. FIG. 4). In an alternative embodiment (see e.g. FIG. 6), the eNB 300 may transmit, to a network element of the WLAN (e.g., the AP 200), information related to said mapping simultaneously, or substantially simultaneously, as a transmission of a data packet to said network element of the WLAN. The aforementioned information related to the mapping may comprise a Logical Channel Identifier (LCID) for each one of the at least one bearer identified to be aggregated between the WWAN and the WLAN. Additionally, or alternatively, the information related to the mapping may comprise an ID of the specific UE, i.e. a UE ID, to which said each one of the least one bearer identified to be aggregated between the WWAN and the WLAN belongs. Still further, the information related to the mapping may additionally, or alternatively, comprise WLAN QoS attributes for each one of the least one bearer identified to be aggregated between the WWAN and the WLAN.

Figure 9:
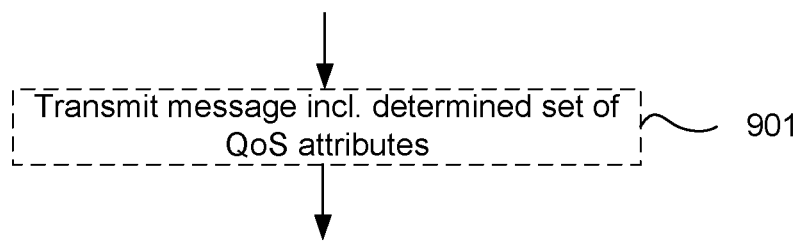
FIG. 9 is a flowchart of an embodiment of a method performed by a network element of a WWAN, e.g. an eNB.

Turning now to FIG. 9, additional optional actions, or steps, that may be performed by the eNB 300 will be described. For example, the eNB 300 may transmit 901, to a network element of the WLAN (e.g., the AP 200), information related to the earlier-determined 701 set of WWAN QoS attributes for each bearer of said at least one bearer identified to be aggregated between the WWAN and the WLAN (see e.g. FIG. 3). In an alternative embodiment (see e.g. FIG. 5), the eNB 300 may transmit, to a network element of the WLAN (e.g., the AP 200), information related to the determined set of WWAN QoS attributes for each bearer of said at least one bearer identified to be aggregated between the WWAN and the WLAN simultaneously, or substantially simultaneously, as a transmission of a data packet to the network element of the WLAN. The aforementioned information related to the determined set of WWAN QoS attributes may additionally comprise a LCID for each one of the least one bearer identified to be aggregated between the WWAN and the WLAN and/or an UE ID of the specific UE to which said each one of the least one bearer identified to be aggregated between the WWAN and the WLAN belongs.

In some embodiments, the eNB 300 may also transmit, to the network element of the WLAN (e.g., the AP 200), a data packet along with the LCID and the UE ID of the specific UE.

Figure 10:
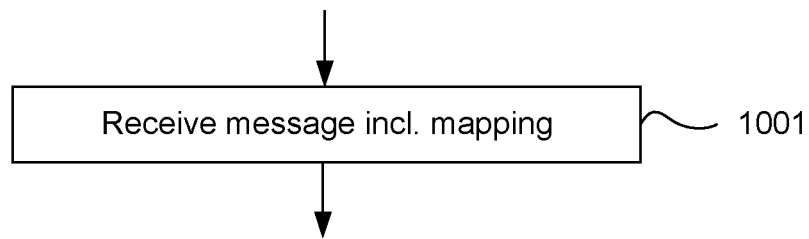
FIG. 10 is a flowchart of an embodiment of a method performed by a network element of a WLAN, e.g. a WLAN AP.

Turning now to FIG. 10, a method performed by a network element of the WLAN, e.g. the AP 200, will be described. This method may be used for implementing the embodiments described with reference to FIGS. 4 and 6, i.e. the method is for use in aggregation (or, integration) between a WWAN (e.g., 3GPP LTE) and a WLAN (e.g., Wi-Fi). In the following, the network element of the WLAN will be exemplified as an AP 200 and the network element of the WWAN will be exemplified as an eNB 300 of the WWAN in order to facilitate the reading of the disclosure.

As can be seen in FIG. 10, the AP 200 receives 1001, from a network element of the WWAN (e.g., the eNB 300), information related to a mapping, wherein the mapping is a mapping of a set of WWAN QoS attributes for each bearer in the WWAN with corresponding WLAN QoS attributes in the WLAN. In some embodiments (see e.g. FIG. 6), the AP 200 may receive the information related to said mapping is at the same time, or substantially at the same time, as a reception of a data packet from the network element of the WWAN. The aforementioned information related to said mapping may e.g. comprise a LCID for each one of the least one bearer identified to be aggregated between the WWAN and the WLAN, an ID of the specific UE to which said each one of the least one bearer identified to be aggregated between the WWAN and the WLAN belongs, and/or WLAN QoS attributes for each one of the least one bearer identified to be aggregated between the WWAN and the WLAN.

Figure 11:
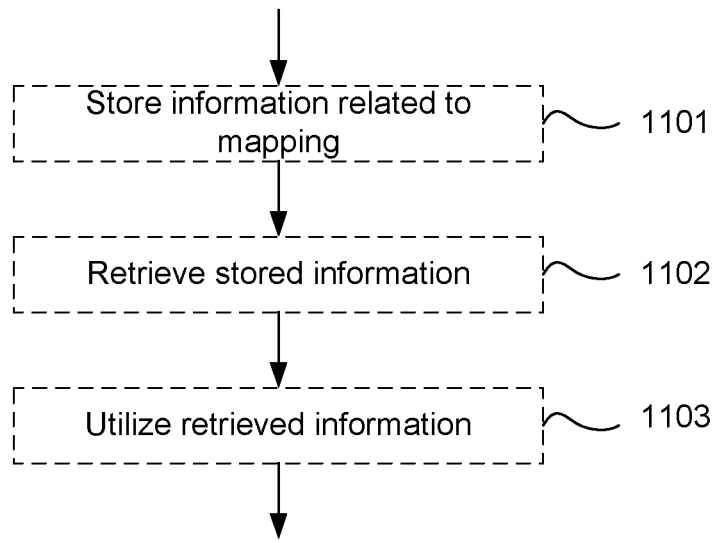
FIG. 11 is a flowchart of an embodiment of a method performed by a network element of a WLAN, e.g. a WLAN AP.

With reference to FIG. 11, optional additional actions, or steps, performed by the AP 200 will be described. The AP 200 may store 1101 said information related to said mapping in a memory module of the AP 200. Also, the AP 200 may retrieve 1102 said information related to said mapping from the memory module. Still further, the AP 200 may utilize 1103 or otherwise make use of the retrieved information related to said mapping during communications with said specific UE. According to some embodiments, and prior to retrieving 1102 said information related to said mapping from the memory module, the AP 200 may also receive (from the network element of the WWAN such as eNB 300) a data packet along with the LCID and the UE ID of the specific UE.

Figure 12:
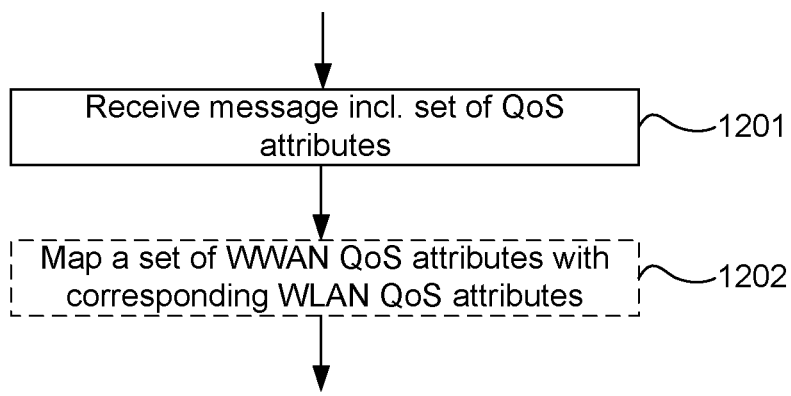
FIG. 12 is a flowchart of an embodiment of a method performed by a network element of a WLAN, e.g. a WLAN AP.

Turning now to FIG. 12, another method performed by a network element of the WLAN, e.g. the AP 200, will be described. This method may also be used for implementing the embodiments described with reference to FIGS. 3 and 5, i.e. the method is for use in aggregation (or, integration) between a WWAN (e.g., 3GPP LTE) and a WLAN (e.g., Wi-Fi). In the following, the network element of the WLAN will be exemplified as an AP 200 and the network element of the WWAN will be exemplified as an eNB 300 of the WWAN in order to facilitate the reading of the disclosure.

As is illustrated in FIG. 12, the AP 200 receives 1201 (from a network element of the WWAN, such as the eNB 300), information related to a determined set of WWAN QoS attributes for each bearer of at least one bearer identified to be aggregated between the WWAN and the WLAN. In some embodiments (see e.g. FIG. 5), the AP 200 may receive information related to said determined set of WWAN QoS attributes at the same time, or substantially at the same time, as when receiving a data packet from the network element of the WWAN. The information related to the determined set of WWAN QoS attributes may additionally comprise a LCID for each one of the least one bearer identified to be aggregated between the WWAN and the WLAN, and/or an UE ID of the specific UE to which said each one of the least one bearer identified to be aggregated between the WWAN and the WLAN belongs.

The AP 200 may additionally, for each one of the at least one bearer being identified to be aggregated between the WWAN and the WLAN, map the determined set of WWAN QoS attributes for each bearer with corresponding WLAN QoS attributes in the WLAN.

Figure 13:
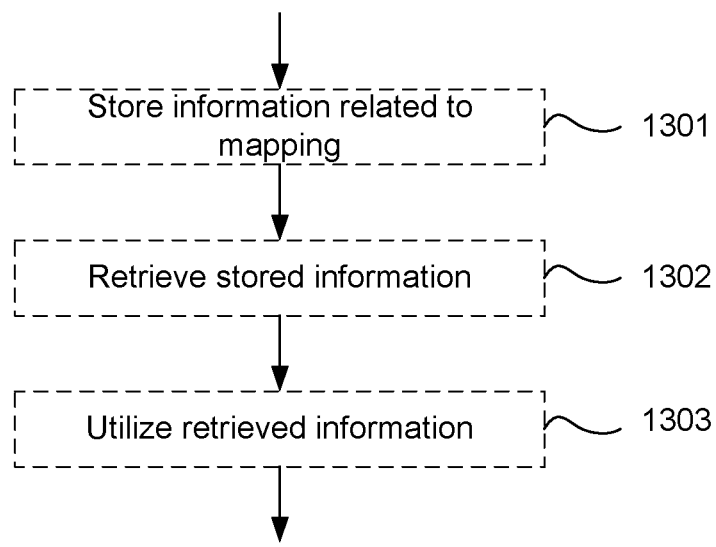
FIG. 13 is a flowchart of an embodiment of a method performed by a network element of a WLAN, e.g. a WLAN AP.

With reference to FIG. 13, it should be appreciated that the AP 200 may optionally store 1301 said information related to said mapping in a memory module of the AP 200, retrieve 1302 said information related to said mapping from the memory module, and utilize 1303 the retrieved information related to said mapping during communications with said specific UE.

According to some embodiments, and prior to retrieving 1302 said information related to said mapping from the memory module, the AP 200 may receive (from the network element of the WWAN) a data packet along with the LCID and the ID of the specific UE.

As will be appreciated by those skilled in the art, the methods described herein may be implemented in various ways. For example, one or more computer programs, comprising instructions which, when executed on at least one processor, cause the at least one processor to carry out any one of the methods described hereinabove may be provided. A carrier containing said computer program may also be provided. The carrier may be one of an electronic signal, an optical signal, a radio signal, or a computer readable storage medium.

Figure 14:
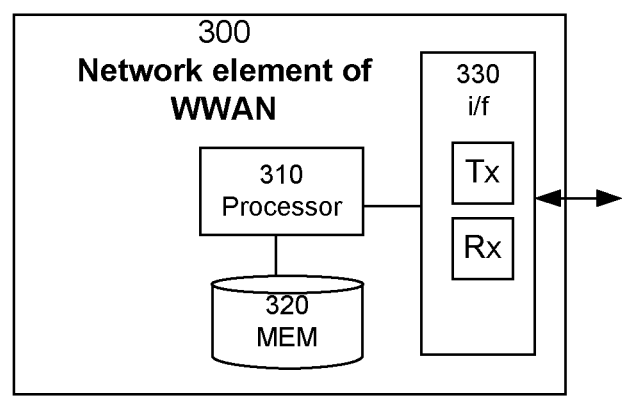
FIG. 14 schematically illustrates an embodiment of a network element of a WWAN, such as an eNB, according to an embodiment.
Figure 15:
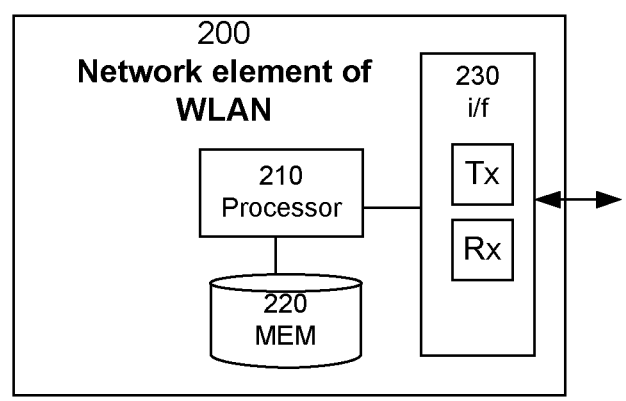
FIG. 15 schematically illustrates an embodiment of a network element of a WLAN, such as an AP, according to an embodiment.

Turning now to FIGS. 14 and 15, various embodiments of apparatuses (i.e. network elements of the WWAN and the WLAN, respectively) for implementing the above-mentioned methods will be described.

FIG. 14 illustrates an embodiment of a network element 300 of a WWAN for use in aggregation between the WWAN and a WLAN. The network element of the WWAN may be embodied as an evolved NodeB (eNB). In order to enhance clarity, the term eNB 300 will be used for denoting the network element 300 in the following.

In one implementation, the eNB 300 comprises a processor 310, a memory 320 and a communications interface 330. The communications interface 330 may comprise at least one transmitter (Tx) and at least one receiver (Rx).

The eNB 300 may optionally comprise means 310, 320, 330 adapted to determine a set of WWAN QoS attributes for each bearer of one or more bearers associated with a specific UE (a.k.a mobile wireless device 100). In one implementation, the means 310, 320, 330 adapted to determine a set of WWAN QoS attributes for each bearer of one or more bearers associated with a specific UE comprises the processor 310, the memory 320 and the communications interface 330. For example, the memory 320 may store computer program code, which, when run in the processor 310 causes the eNB 300 to receive, via the receiver 330, a set of WWAN QoS attributes for each bearer of one or more bearers associated with a specific UE. For example, the eNB 300 may receive the set of WWAN QoS attributes from a MME 400. Moreover, the memory 320 may store computer program code, which, when run in the processor 310 causes the eNB 300 to determine said set of WWAN QoS attributes for each bearer of one or more bearers associated with a specific UE, e.g. from the received set of WWAN QoS attributes.

Moreover, the eNB 300 comprises means 310, 320 adapted to decide that an aggregation between the WWAN and the WLAN is to be performed for at least one bearer of said one or more bearers of the UE. In one example implementation, the memory 320 stores computer program code, which, when run in the processor 310 causes the eNB 300 to decide that an aggregation between the WWAN and the WLAN is to be performed for at least one bearer of said one or more bearers of the UE.

The eNB 300 also comprises means 310, 320 adapted to identify which one(s) of said at least one bearer of said specific UE that is/are to be aggregated between the WWAN and the WLAN. In one implementation, the memory 320 stores computer program code, which, when run in the processor 310 causes the eNB 300 to identify which one(s)

of said at least one bearer of said specific UE that is/are to be aggregated between the WWAN and the WLAN.

Still further, the eNB 300 comprises means 310, 320 adapted to packet-level schedule of each one of said at least one bearer identified to be aggregated between the WWAN and the WLAN. In one example implementation, the memory 320 stores computer program code, which, when run in the processor 310 causes the eNB 300 to packet-level schedule of each one of said at least one bearer identified to be aggregated between the WWAN and the WLAN.

In some embodiments, the eNB 300 comprises means 310, 320 adapted to determine, for each data packet, whether the data packet is to be transmitted over the WWAN or the WLAN. In one example implementation, the memory 320 stores computer program code, which, when run in the processor 310 causes the eNB 300 to determine, for each data packet, whether the data packet is to be transmitted over the WWAN or the WLAN. In one embodiment, the determination may be based on information related to load of WWAN radio cells and WLAN radio cells. Additionally, or alternatively, the determination may be based on information related to radio measurements of WWAN radio cells and WLAN radio cells.

Still further, the eNB 300 may comprise means 310, 320 adapted to map a set of WWAN QoS attributes for each bearer in the WWAN with corresponding WLAN QoS attributes in the WLAN. In one example implementation, the memory 320 stores computer program code, which, when run in the processor 310 causes the eNB 300 to map a set of WWAN QoS attributes for each bearer in the WWAN with corresponding WLAN QoS attributes in the WLAN. In some embodiments, the eNB 300 also comprises means 330 adapted to transmit, to a network element of the WLAN (e.g. AP 200), information related to said mapping. For example, said means 330 adapted to transmit information related to said mapping may be implemented by the transmitter (Tx). The aforementioned information related to said mapping may e.g. comprise: a LCID for each one of the at least one bearer identified to be aggregated between the WWAN and the WLAN; an ID of the specific UE to which said each one of the least one bearer identified to be aggregated between the WWAN and the WLAN belongs; and/or WLAN QoS attributes for each one of the least one bearer identified to be aggregated between the WWAN and the WLAN.

In some embodiments, the eNB 300 may comprise means 330 adapted to transmit, to a network element of the WLAN (e.g. AP 200), information related to the earlier-mentioned determined set of WWAN QoS attributes for each bearer of said at least one bearer identified to be aggregated between the WWAN and the WLAN. For example, said means 330 adapted to transmit information related to the earlier-mentioned determined set of WWAN QoS attributes for each bearer of said at least one bearer identified to be aggregated between the WWAN and the WLAN may be implemented by the transmitter (Tx). The above-mentioned information related to the determined set of WWAN QoS attributes may e.g. additionally comprise: a LCID for each one of the least one bearer identified to be aggregated between the WWAN and the WLAN; and/or an ID of the specific UE to which said each one of the least one bearer identified to be aggregated between the WWAN and the WLAN belongs.

In some embodiments, the eNB 300 comprises means 330 adapted to transmit, to the network element of the WLAN (e.g. AP 200), a data packet along with the LCID and the ID of the specific UE. For example, and in accordance with one example implementation, the means 330 adapted to transmit the data packet along with the LCID and the ID of the specific UE may be implemented by the transmitter 330.

FIG. 15 illustrates an embodiment of a network element 200 of a WLAN for use in aggregation between a WWAN and the WLAN. The network element of the WLAN may be embodied as an Access Point (AP). In order to enhance clarity, the term AP 200 will be used for denoting the network element 200 in the following.

In one implementation, the AP 200 comprises a processor 210, a memory 220 and a communications interface 230. The communications interface 230 may comprise at least one transmitter (Tx) and at least one receiver (Rx).

In one embodiment, the AP 200 comprises means 230 adapted to receive, from a network element of the WWAN (e.g. eNB 300), information related to a mapping, wherein said mapping is a mapping of a set of WWAN QoS attributes for each bearer in the WWAN with corresponding WLAN QoS attributes in the WLAN. In one implementation the means 230 adapted to receive said information related to the mapping may be implemented by the receiver (Rx). Said information related to said mapping may e.g. comprise: a LCID for each one of the least one bearer identified to be aggregated between the WWAN and the WLAN; an ID of the specific UE to which said each one of the least one bearer identified to be aggregated between the WWAN and the WLAN belongs; and/or said WLAN QoS attributes for each one of the least one bearer identified to be aggregated between the WWAN and the WLAN. The AP 200 may also comprise means adapted to store said information related to said mapping in a memory module (not shown) of the AP 200; means adapted to retrieve said information related to said mapping from the memory module; and means adapted to utilize the retrieved information related to said mapping during communications with said specific UE. In one example implementation, the memory 220 may e.g. store computer program code, which, when run in the processor 210 causes the AP 200 to store said information related to said mapping in a memory module (not shown) of the AP 200, retrieve said information related to said mapping from the memory module, and utilize the retrieved information related to said mapping during communications with said specific UE. Moreover, the AP 200 may comprise means adapted to, prior to retrieving said information related to said mapping from the memory module, receiving (from the network element of the WWAN) a data packet along with the LCID and the ID of the specific UE. In one implementation, said means may be implemented by the receiver (Rx) 230.

In one embodiment, the AP 200 comprises means 230 adapted to receive, from a network element of the WWAN (e.g. eNB 300), information related to a determined set of WWAN QoS attributes for each bearer of at least one bearer identified to be aggregated between the WWAN and the WLAN. For example, and in accordance with one example implementation, the means adapted to receive the information related to a determined set of WWAN QoS attributes for each bearer of at least one bearer identified to be aggregated between the WWAN and the WLAN may be implemented by means of the receiver (Rx) 230. Said information related to the determined set of WWAN QoS attributes may additionally comprise a LCID for each one of the least one bearer identified to be aggregated between the WWAN and the WLAN; and/or an ID of the specific UE to which said each one of the least one bearer identified to be aggregated between the WWAN and the WLAN belongs.

Moreover, the AP 200 may additionally comprise means 210, 220 adapted to map the determined set of WWAN QoS attributes for each bearer with corresponding WLAN QoS attributes in the WLAN. For example, in one example implementation the memory 220 may e.g. store computer program code, which, when run in the processor 210 causes the AP 200 to map the determined set of WWAN QoS attributes for each bearer with corresponding WLAN QoS attributes in the WLAN. In one embodiment, the AP 200 further comprises means adapted to store said information related to said mapping in a memory module (not shown) of the AP 200; means adapted to retrieve said information related to said mapping from the memory module; and means adapted to utilize the retrieved information related to said mapping during communications with said specific UE. In one example implementation, the memory 220 may e.g. store computer program code, which, when run in the processor 210 causes the AP 200 to store said information related to said mapping in a memory module (not shown) of the AP 200; retrieve said information related to said mapping from the memory module; and utilize the retrieved information related to said mapping during communications with said specific UE.

The AP 200 may further comprise means 230 adapted to, prior to retrieving said information related to said mapping from the memory module, receive (from the network element of the WWAN, e.g. eNB 300), a data packet along with the LCID and the ID of the specific UE. For instance, the means 230 adapted to, receive the data packet along with the LCID and the ID of the specific UE may be implemented by means of the receiver (Rx) 230.

The various embodiments disclosed herein enable the WLAN side to become aware of QoS attributes of the WWAN side, and vice versa. This may allow for an alternative, yet improved way, of integration (or, aggregation) between WWAN (e.g. 3GPP LTE) and WLAN (e.g. Wi-Fi).

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Although specific terms may be employed herein, they are used in a generic and descriptive sense only and not for purposes of limitation.

The invention claimed is:

1. A method for use in aggregation between a Wireless Wide Area Network, WWAN, and a Wireless Local Area Network, WLAN, the method being performed by a network element of the WWAN, the method comprising:
   deciding that an aggregation between the WWAN and the WLAN is to be performed for at least one bearer associated with a specific user equipment, UE;
   identifying which ones of the at least one bearer associated with the specific UE that are to be aggregated between the WWAN and the WLAN; and
   packet-level scheduling of each one of the at least one bearer identified to be aggregated between the WWAN and the WLAN by deciding for each data packet in each one of the at least one bearer identified to be aggregated between the WWAN and the WLAN whether the data packet is to be transmitted over the WWAN or WLAN.

2. The method according to claim 1, wherein the deciding for each data packet in each one of the at least one bearer identified to be aggregated between the WWAN and the WLAN whether the data packet is to be transmitted over the WWAN or the WLAN is based on information related to load of WWAN radio cells and WLAN radio cells.

3. The method according to claim 1, wherein the deciding for each data packet in each one of the at least one bearer identified to be aggregated between the WWAN and the WLAN whether the data packet is to be transmitted over the WWAN or the WLAN is based on information related to radio measurements of WWAN radio cells and WLAN radio cells.

4. The method according to claim 1, comprising, prior to deciding that an aggregation between the WWAN and the WLAN is to be performed:
   determining a set of WWAN Quality of Service, QoS, attributes for each bearer associated with the specific UE.

5. The method according to claim 4, further comprising, for each bearer being identified to be aggregated between the WWAN and the WLAN:
   mapping the set of WWAN QoS attributes for each bearer in the WWAN with corresponding WLAN QoS attributes in the WLAN.

6. The method according to claim 5, further comprising:
transmitting, to a network element of the WLAN, information related to the mapping.

7. The method according to claim 6, wherein the information related to the mapping comprises at least one from the group consisting of:
a Logical Channel Identifier, LCID, for each bearer identified to be aggregated between the WWAN and the WLAN;
an identity, ID, of the specific UE to which each bearer identified to be aggregated between the WWAN and the WLAN belongs; and
the WLAN QoS attributes for each bearer identified to be aggregated between the WWAN and the WLAN.

8. The method according to claim 4, further comprising:
transmitting, to a network element of the WLAN, information related to the set of WWAN QoS attributes for each bearer identified to be aggregated between the WWAN and the WLAN.

9. The method according to claim 8, wherein the information related to the determined set of WWAN QoS attributes further comprises at least one from the group consisting of:
a Logical Channel Identifier, LCID, for each one of the least one bearer identified to be aggregated between the WWAN and the WLAN; and
an ID of the specific UE to which each bearer identified to be aggregated between the WWAN and the WLAN belongs.

10. The method according to claim 7, further comprising:
transmitting, to the network element of the WLAN, a data packet along with the LCID and the ID of the specific UE.

11. The method according to claim 1, wherein the network element of the WWAN is an evolved NodeB, eNB, and the network element of the WLAN is an Access Point, AP.

12. A method for use in aggregation between a Wireless Wide Area Network, WWAN, and a Wireless Local Area Network, WLAN, the method being performed by a network element of the WLAN, the method comprising:
receiving, from a network element of the WWAN, information related to a mapping, the mapping being a mapping of a set of WWAN QoS attributes for each bearer in the WWAN with corresponding WLAN QoS attributes in the WLAN, the information related to the mapping comprising an ID of a specific user equipment, UE, to which each bearer identified to be aggregated between the WWAN and the WLAN belongs.

13. The method according to claim 12, wherein the information related to the mapping comprises:
a Logical Channel Identifier, LCID, for each bearer identified to be aggregated between the WWAN and the WLAN;
and
the WLAN QoS attributes for each bearer identified to be aggregated between the WWAN and the WLAN.

14. The method according to claim 12, comprising:
storing the information related to the mapping in a memory module of the network element of the WLAN;
retrieving the information related to the mapping from the memory module; and
utilizing the retrieved information related to the mapping during communications with the specific UE.

15. The method according to claim 14, further comprising, prior to retrieving the information related to the mapping from the memory module:
receiving, from the network element of the WWAN, a data packet along with a Logical Channel Identifier, LCID, and the ID of the specific UE.

16. The method according to claim 12, wherein the network element of the WLAN is an Access Point, AP, and wherein the network element of the WWAN is an evolved NodeB, eNB.

17. A method for use in aggregation between a Wireless Wide Area Network, WWAN, and a Wireless Local Area Network, WLAN, the method being performed by a network element of the WLAN, the method comprising:
receiving, from a network element of the WWAN, information related to a determined set of WWAN QoS attributes for each bearer identified to be aggregated between the WWAN and the WLAN, the information comprising an ID of a specific user equipment, UE, to which each bearer identified to be aggregated between the WWAN and the WLAN belongs.

18. The method according to claim 17, wherein the information related to the determined set of WWAN QoS attributes further comprises:
a Logical Channel Identifier, LCID, for each one of the least one bearer identified to be aggregated between the WWAN and the WLAN.

19. The method according to claim 17, further comprising, for each bearer being identified to be aggregated between the WWAN and the WLAN:
mapping the WWAN QoS attributes for each bearer with corresponding WLAN QoS attributes in the WLAN.

20. The method according to claim 19, further comprising:
storing the information related to the mapping in a memory module of the network element of the WLAN;
retrieving the information related to the mapping from the memory module; and
utilizing the retrieved information related to the mapping during communications with a specific user equipment, UE.

21. The method according to claim 20, further comprising, prior to retrieving the information related to the mapping from the memory module:
receiving, from the network element of the WWAN, a data packet along with the LCID and the ID of the specific UE.

22. The method according to claim 17, wherein the network element of the WLAN is an access point, AP, and wherein the network element of the WWAN is an evolved NodeB, eNB.

23. A network element of a Wireless Wide Area Network, WWAN, for use in aggregation between the WWAN and a Wireless Local Area Network, WLAN, the network element of the WWAN comprising:
means configured to decide that an aggregation between the WWAN and the WLAN is to be performed for at least one bearer associated with a specific user equipment, UE;
means configured to identify which of the at least one bearer associated with the specific UE are to be aggregated between the WWAN and the WLAN; and
means configured to packet-level schedule each bearer identified to be aggregated between the WWAN and the WLAN by deciding for each data packet in each one of the at least one bearer identified to be aggregated between the WWAN and the WLAN whether the data packet is to be transmitted over the WWAN or WLAN.

24. A network element of a Wireless Wide Area Network, WWAN, for use in aggregation between the WWAN and a Wireless Local Area Network, WLAN, the network element of the WWAN comprising:
- a processor; and
- a memory storing computer program code, which, when run in the processor causes the network element of the WWAN to:
  - decide that an aggregation between the WWAN and the WLAN is to be performed for at least one bearer associated with a specific user equipment, UE;
  - identify which ones of the at least one bearer associated with the specific UE that are to be aggregated between the WWAN and the WLAN; and
  - packet-level schedule of each bearer identified to be aggregated between the WWAN and the WLAN by deciding for each data packet in each one of the at least one bearer identified to be aggregated between the WWAN and the WLAN whether the data packet is to be transmitted over the WWAN or WLAN.

25. The network element of the WWAN according to claim 23, wherein the network element of the WWAN is an evolved NodeB, eNB.

26. A network element of a Wireless Local Area Network, WLAN, for use in aggregation between a Wireless Wide Area Network, WWAN, and the WLAN, the network element of the WLAN comprising:
- means configured to receive, from a network element of the WWAN, information related to a mapping, wherein the mapping is a mapping of a set of WWAN QoS attributes for each bearer in the WWAN with corresponding WLAN QoS attributes in the WLAN, the information related to the mapping comprising an ID of a specific UE to which each bearer identified to be aggregated between the WWAN and the WLAN belongs.

27. A network element of a Wireless Local Area Network, WLAN, for use in aggregation between a Wireless Wide Area Network, WWAN, and the WLAN, the network element of the WLAN comprising:
- a receiver;
- a processor; and
- a memory storing computer program code, which, when run in the processor causes the network element of the WLAN to:
  - receive, from a network element of the WWAN via the receiver, information related to a mapping, the mapping being a mapping of a set of WWAN QoS attributes for each bearer in the WWAN with corresponding WLAN QoS attributes in the WLAN, the information related to the mapping comprising an ID of a specific UE to which each bearer identified to be aggregated between the WWAN and the WLAN belongs.

28. A network element of a Wireless Local Area Network, WLAN, for use in aggregation between a Wireless Wide Area Network, WWAN, and the WLAN, the network element of the WLAN comprising:
- means configured to receive, from a network element of the WWAN, information related to a determined set of WWAN QoS attributes for each bearer of at least one bearer identified to be aggregated between the WWAN and the WLAN, the information comprising an ID of a specific UE to which each bearer identified to be aggregated between the WWAN and the WLAN belongs.

29. A network element of a Wireless Local Area Network, WLAN, for use in aggregation between a Wireless Wide Area Network, WWAN, and the WLAN, the network element of the WLAN comprising:
- a receiver;
- a processor; and
- a memory storing computer program code, which, when run in the processor causes the network element of the WLAN to:
  - receive, from a network element of the WWAN via the receiver, information related to a determined set of WWAN QoS attributes for each bearer of at least one bearer identified to be aggregated between the WWAN and the WLAN, the information comprising an ID of a specific UE to which each bearer identified to be aggregated between the WWAN and the WLAN belongs.

30. The network element of the WLAN according to claim 26, wherein the network element of the WLAN is an AP.

* * * * *